(12) United States Patent
Borges et al.

(10) Patent No.: US 10,377,015 B2
(45) Date of Patent: Aug. 13, 2019

(54) DUST EXTRACTION DEVICE (71) Applicant: 3M INNOVATIVE PROPERTIES COMPANY, St. Paul, MN (US)

(72) Inventors: Luiz Daniel A. Borges, São Paulo (BR); Yuri C. Fontes, São Paulo (BR); Alex W. Borro, São Paulo (BR)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 15/526,029

(22) PCT Filed: Dec. 14, 2015

(86) PCT No.: PCT/US2015/065540
§ 371 (c)(1),
(2) Date: May 11, 2017

(87) PCT Pub. No.: WO2016/109175
PCT Pub. Date: Jul. 7, 2016

(65) Prior Publication Data
US 2017/0304993 A1    Oct. 26, 2017

Related U.S. Application Data (60) Provisional application No. 62/098,736, filed on Dec. 31, 2014.

(51) Int. Cl.
*B24B 55/06*    (2006.01)
*B08B 15/04*    (2006.01)
(Continued)

(52) U.S. Cl.
CPC ............... *B24B 55/06* (2013.01); *B08B 5/04* (2013.01); *B08B 15/04* (2013.01); *B23Q 11/0046* (2013.01); *Y02P 70/171* (2015.11)

(58) Field of Classification Search
CPC ....... B08B 15/04; B08B 5/04; B23Q 11/0046; B24B 55/06; Y02P 70/171
(Continued)

(56) References Cited

U.S. PATENT DOCUMENTS 3,688,991 A * 9/1972 Andrews ................. B02C 19/06
241/27
4,241,877 A * 12/1980 Hughes ..................... B05B 7/10
137/808
(Continued)

FOREIGN PATENT DOCUMENTS

DE    2439069 A1 * 2/1976    ............... B08B 5/04
DE    31 25 619    1/1983
(Continued)

*Primary Examiner* — Marc Carlson (57) ABSTRACT

Described herein are articles, assemblies, and methods that use a dust extraction device having a body with a chamber, a first inlet communicating with the chamber extending along a first inlet axis and adapted for releasable connection to a source of pressurized gas, a second inlet communicating with the chamber extending along a second inlet axis and adapted for releasable connection to a dust source, and an outlet extending along an outlet axis and communicating with the chamber. The outlet is adapted for releasable connection to a receptacle, with the outlet comprising at least one baffle that diverts flow of the gas within the outlet.

15 Claims, 8 Drawing Sheets

(51) Int. Cl.
*B08B 5/04* (2006.01)
*B23Q 11/00* (2006.01)

(58) Field of Classification Search
USPC .......................................................... 15/339
See application file for complete search history.

(56) References Cited

U.S. PATENT DOCUMENTS

| | | | | |
|---|---|---|---|---|
| 4,985,058 | A * | 1/1991 | Prinsloo | B04C 3/00 55/396 |
| 6,049,941 | A * | 4/2000 | Vollenweider, II | A47L 5/18 15/327.5 |
| 6,289,956 | B1 * | 9/2001 | Shriver | B23Q 11/006 144/114.1 |
| 6,599,175 | B2 * | 7/2003 | Herb | B24B 37/16 451/287 |
| 8,590,549 | B2 * | 11/2013 | Dollinger | B08B 5/04 134/132 |
| 9,289,709 | B2 * | 3/2016 | Barker | B01D 45/14 |
| 2001/0006121 | A1 * | 7/2001 | Kleine | B23B 51/06 175/213 |
| 2002/0141836 | A1 * | 10/2002 | Ege | B23Q 11/0046 408/67 |
| 2002/0152731 | A1 * | 10/2002 | Reich | B23Q 11/0046 55/385.1 |
| 2006/0107633 | A1 * | 5/2006 | Walker | B04C 5/187 55/385.1 |
| 2013/0219843 | A1 * | 8/2013 | Barker | B01D 45/14 55/423 |

FOREIGN PATENT DOCUMENTS

| | | | |
|---|---|---|---|
| DE | 40 23 464 | 1/1992 | |
| GB | 728 981 | 4/1955 | |
| GB | 2 446 902 | 8/2008 | |
| WO | WO 1997/009151 | 3/1997 | |
| WO | WO 2008/033973 | 3/2008 | |
| WO | WO 2008/034035 | 3/2008 | |
| WO | WO-2008033973 A1 * | 3/2008 | ........... B24B 23/005 |

* cited by examiner

DUST EXTRACTION DEVICE

CROSS REFERENCE TO RELATED APPLICATIONS

This application is a national stage filing under 35 U.S.C. 371 of PCT/US2015/065540, filed 14 Dec. 2015, which claims the benefit of U.S. Provisional Patent Application No. 62/098,736, filed 31 Dec. 2014, the disclosures of which are incorporated by reference in their entirety herein.

FIELD OF THE INVENTION

Provided herein are devices, systems, and methods useful for extraction of dust from a dust source. Such dust sources include tools used in a manufacturing or finishing process, such as an abrading device.

BACKGROUND

Dust extraction has become an increasingly important environmental and safety factor in industrial processes today. Sanding operations, conducted by hand or by machine, often generate fine particles as abrasive surfaces are rubbed against a substrate. These particulates, when sufficiently small, degrade air quality and pose a significant health risk to operators. In many countries, dust extraction is even mandated by law for sanding operations conducted on a significant scale. Accordingly, manufacturers and consumers alike have sought improved ways to eliminate airborne dust from their working environments.

Conceptually, dust extraction comprises the three basic steps of capturing, conveying, and collecting fine particles. The capture step can be achieved, for example, by providing a port next to the dust source into which the dust can be drawn. The conveying step is often achieved using air flow through a duct that is suitably sized to keep the dust suspended and avoid clogging. Finally, the collecting step entails bringing all of the dust together in a suitable receptacle. This is commonly achieved by directing the air through a flow-through filter, but could also involve using more sophisticated collectors that operate based on electrostatic or chemical attraction.

Unfortunately, the process of capturing and conveying dust as described above can be very noisy. Simple dust collection systems, which use a vacuum unit to create suction and air filtration, often generate high levels of noise attributable to the vacuum unit. Some devices known in the art achieve dust extraction based on a Venturi effect. These devices use a source of positively pressurized air that flows through a constricted tube to generate a low pressure zone, thus providing suction needed to capture and convey unwanted dust. These Venturi devices generally operate more quietly than fan-driven vacuum systems. Meaningful noise reduction promotes a healthier and more pleasant work environment and is highly valued by consumers.

SUMMARY

It was discovered that even devices that employ a Venturi effect to generate suction used for dust extraction generate excessive noise resulting from air impingement against internal wall surfaces of the device and adjoining duct work. In particular, a sharp transition from orderly, laminar air flow to turbulent air flow within these devices can cause aggression of air against these surfaces, which in turn induces vibrations of these surfaces, producing noise. The abruptness of this transition can be alleviated significantly by interposing one or more structural elements within the device, altering the air flow profile in a manner that increases friction between the air and internal surfaces of the device. This friction reduces the speed of air flow against the device, decreasing pressure and modifying the acoustic waveform of the noise to be more pleasing to the operator.

In a first aspect, a dust extraction device is provided. The dust extraction device comprises: a body having a chamber; a first inlet communicating with the chamber extending along a first inlet axis and adapted for releasable connection to a source of pressurized gas; a second inlet communicating with the chamber extending along a second inlet axis and adapted for releasable connection to a dust source; and an outlet extending along an outlet axis and communicating with the chamber, the outlet adapted for releasable connection to a receptacle, wherein the outlet comprises at least one baffle that diverts flow of the gas within the outlet.

In a second aspect, a method of reducing airborne dust when operating an abrading device using the aforementioned dust extraction device is provided. The method comprises: connecting the first inlet to the source of pressurized gas; connecting the second inlet to the abrading device; connecting the receptacle to the outlet; and flowing the gas through the chamber to induce a Venturi effect whereby dust is evacuated from the abrading device to the receptacle.

Advantageously, the provided dust extraction device represents a compact, low-cost, and low-maintenance solution to the problem of airborne dust that substantially alleviates the harshness of operational noise in the workplace relative to conventional devices known in the art and has a high capacity for removing dust.

BRIEF DESCRIPTION OF THE DRAWINGS

Exemplary embodiments shall be further described with reference to the following drawings.

DEFINITIONS

As used herein:

"cross-sectional area" means the largest area obtained by cutting through a given structure or feature with a plane, with the plane defined perpendicular to a specified axis;

"diameter" means the largest dimension of a given structure or feature;

"distal" means situated away from the center of a given body or from the point of attachment;

"dust" means undesirable fine particulate matter;

"fluid" means a substance that has no fixed shape and yields easily to external pressure, such as a gas or liquid;

"helix angle" means the angle formed between a helix and its corresponding axis; and "Venturi effect" refers to a phenomenon in fluid dynamics whereby pressure decreases when a fluid (such as air) flows through a constricted section of pipe.

DETAILED DESCRIPTION

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Described here are lightweight devices that may be used in an abrading (or sanding) operation conducted in a manufacturing facility, professional repair shop, or home environment such as a garage.

Figure 1:
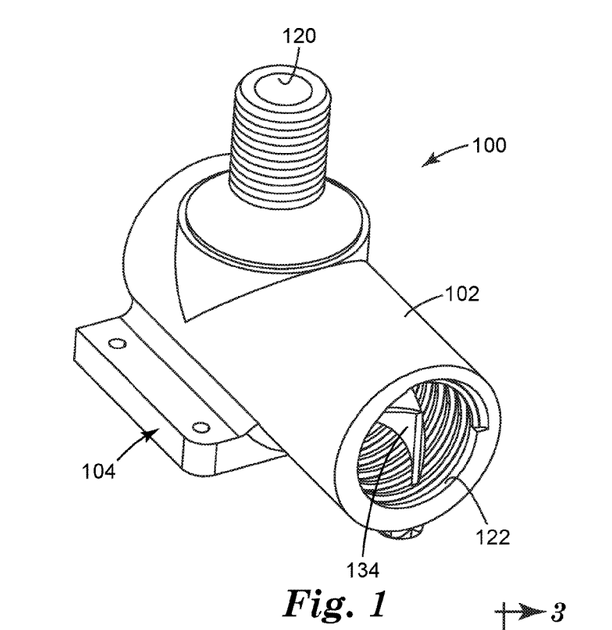
FIG. 1 is a perspective view of a dust extraction device according to a first exemplary embodiment, looking toward its bottom and side surfaces.
Figure 2:
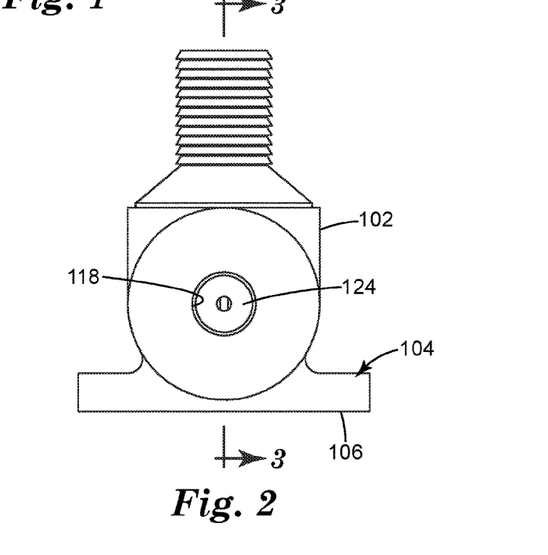
FIG. 2 is a top view of the dust extraction device of FIG. 1 showing its top surfaces.

A dust extraction device is illustrated in FIGS. 1-6 according to one exemplary embodiment and hereinafter referred to by the numeral 100. The device 100 includes a body 102 that optionally has a generally cylindrical shape as shown in FIG. 1. This shape generally corresponds to the internal surfaces of the device 100 and thus helps minimize materials costs. There are, however, no particular restrictions to the exterior shape of the body 102.

Optionally and as shown, the body 102 is connected to a flange 104 that has a flat surface 106 (visible in FIG. 2) for mating engagement to a flat surface of a wall, cart, or other external structure. Such structure can be located remotely from where the sanding operation occurs to mitigate the operator's exposure to noise. The flange 104 may be integrally fabricated with the body 102.

Figure 3:
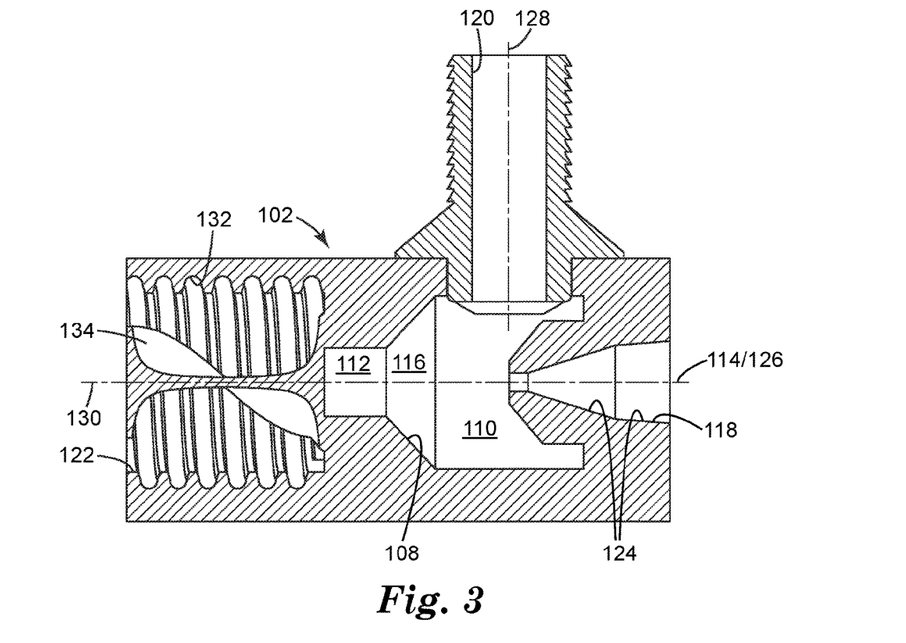
FIG. 3 is a side cross-sectional view of the dust extraction device of FIGS. 1-2 based on section 3-3 shown in FIG. 2.
Figure 4:
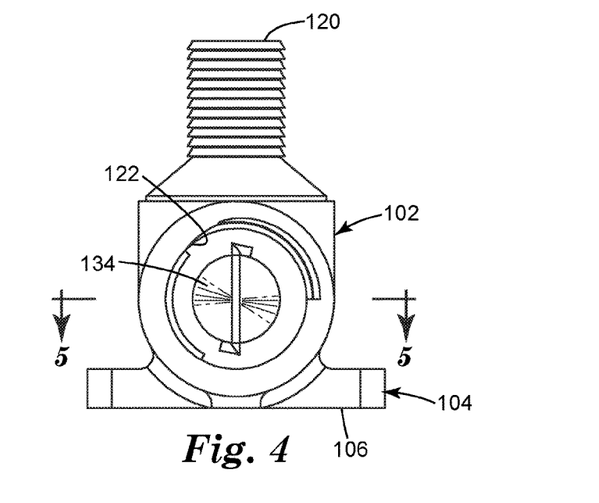
FIG. 4 is a bottom view of the dust extraction device of FIGS. 1-3 showing its bottom surfaces.
Figure 5:
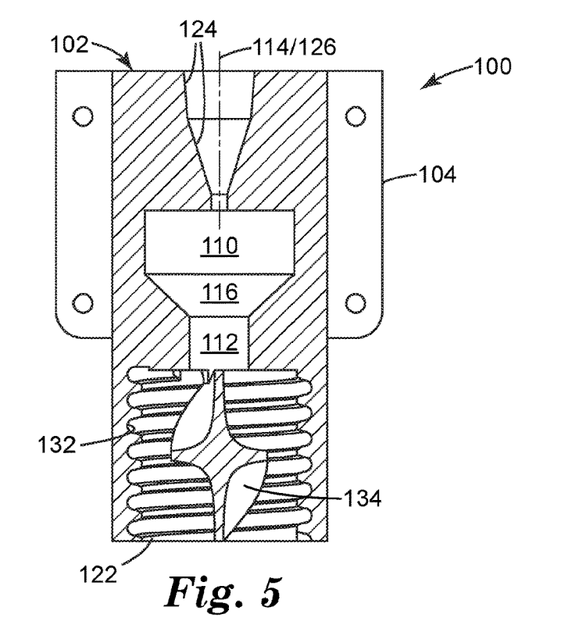
FIG. 5 is a side cross-sectional view of the dust extraction device of FIGS. 1-4 based on section 5-5 shown in FIG. 4.
Figure 6:
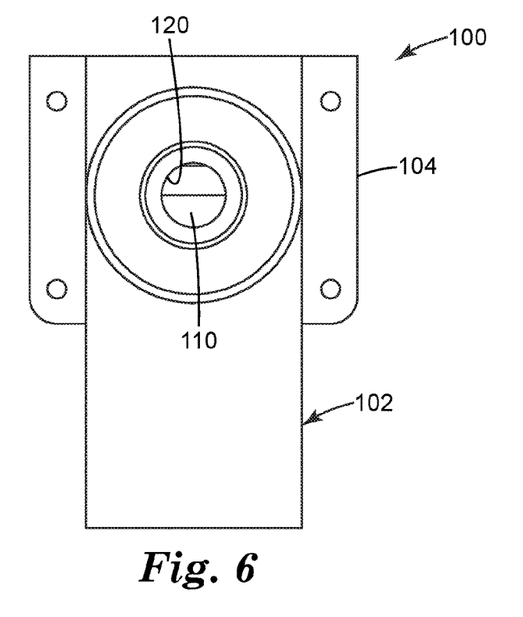
FIG. 6 is a side view of the dust extraction device of FIGS. 1-5 showing its side surfaces.

As shown in the cross-sectional view of FIG. 3, the body 102 partially encloses a chamber 108 within it. In the embodiment shown, the chamber 108 includes a primary region 110 and a peripheral region 112 communicating with the primary region 110. Both the primary region 110 and the peripheral region 112 have generally cylindrical profiles that extend along, and are symmetric about, longitudinal axis 114. If desired, a different cross-sectional shape, such as an oval, rectangle, or some other polygon, may also be used.

Optionally and as shown, the primary region 110 and peripheral region 112 have cross-sectional diameters that significantly differ from each other. Here, the primary region 110 is substantially larger in girth such that its cross-sectional area, as defined perpendicular to the axis 114, is significantly larger than that of the peripheral region 112.

In some embodiments, the ratio of the cross-sectional area of the primary region 110 to that of the peripheral region 112 as defined perpendicular to the axis 114 is at least 1:1, at least 2:1, at least 3:1, at least 7:2, or at least 4:1. In some embodiments, the ratio of the cross-sectional area of the primary region 110 to that of the peripheral region 112 as defined perpendicular to the axis 114 is at most 15:1, at most 12:1, at most 10:1, at most 9:1, or at most 8:1.

The transition between the primary region 110 and peripheral region 112 could be abrupt or gradual. For example, air flowing from the former region to the latter region may encounter a step-function change in cross-sectional diameter, or alternatively, pass through a tapered region 116 such as shown in FIG. 3. Advantageously, inclusion of the tapered region 116 can streamline flow of air through the chamber 108 and reduce turbulence, which is believed to contribute to operational noise.

Referring again to FIG. 3, the device 100 further includes a plurality of openings through which the chamber 108 can communicate with external environment—a first inlet 118 and second inlet 120, each of which separately communicates with the primary region 110, and an outlet 122 that communicates with the peripheral region 112. Each of these conduits will be described in turn.

Figure 7:
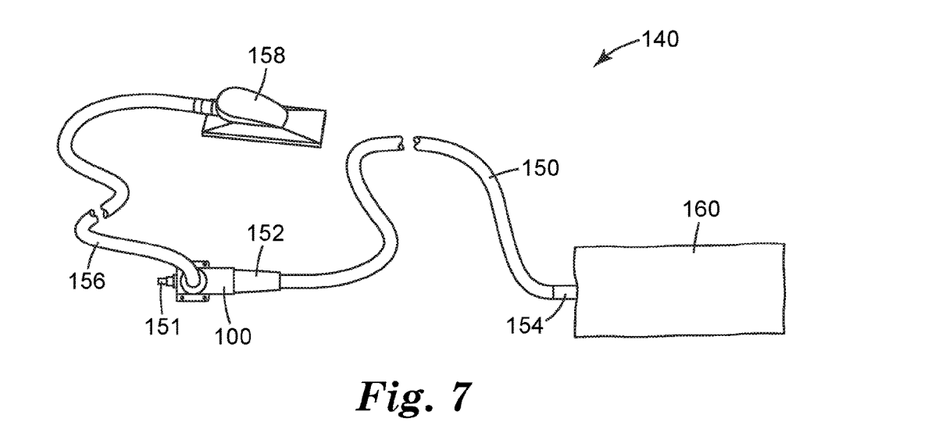
FIG. 7 is a perspective view of a dust extraction system that includes the dust extraction device of FIGS. 1-6.

The first inlet 118 is an elongated passage that has, at its distal end, a configuration adapted for releasable connection to a source of pressurized gas, such as an air compressor. This connection may be direct or indirect. For example, as shown in FIG. 7, the first inlet 118 can be configured to engage a suitable nipple adapter 151. The nipple adapter can be hermetically joined to a length of flexible hose connected at its opposite end to an upstream compressed air source. As a further option, the connection with the source of pressurized gas may include one or more inline valves or regulators that control the air flow to the first inlet 118.

As shown in FIG. 3, the first inlet 118 has a circular cross-section and is symmetrically disposed about a first inlet axis 126 that generally extends along the direction of incoming air flow. Optionally and as shown, the first inlet axis 126 is aligned with the axis 114.

To amplify the Venturi effect generated by the flow of air, the first inlet 118 may be flared. For example, the first inlet 118 may include one or more tapered sections 124. The tapered sections 124 of the first inlet 118 have a diameter that is relatively large at the entrance of the first inlet 118 and generally decreases when approaching the primary region 110. The decrease in diameter may be either linear (as shown in FIG. 3) or have a non-linear (e.g. parabolic) shape. In the exemplary embodiment illustrated in FIG. 3, the first inlet 118 is comprised of three contiguous sections, with the first and second being linearly tapered and the third being non-tapered (cylindrical). By virtue of having a cross-sectional area that generally decreases along the first inlet axis 126, the velocity of air flow through this constriction increases as it approaches the primary region 110, thus creating a low pressure zone in the vicinity of where air exits the first inlet 118. This low pressure zone is attributable to the Venturi effect.

In some embodiments, the ratio of the cross-sectional area of the enlarged, upstream end of the first inlet 118 to that of its reduced downstream end, defined perpendicular to the axis 126, is at least 2:1, at least 4:1, at least 8:1, at least 10:1, or at least 12:1. On the high end, the ratio of the cross-sectional area of the enlarged, upstream end of the first inlet 118 to its reduced downstream end can be at most 40:1, at most 35:1, at most 30:1, at most 25:1, or at most 20:1.

The device 100 further includes a second inlet 120 optionally having a generally cylindrical inner surface that is symmetric about a second inlet axis 128. Optionally and as shown, the exterior surfaces of the second inlet 120 are threaded to enable a releasable connection between the device 100 and a source of airborne dust, not shown in the figures. The walls of the device 100 defining the second inlet 120 may be a separate structure that is coupled to the body 102 or alternatively may be fabricated as an integral part of the body 102 itself.

In common industrial and commercial applications, the source of dust is an abrading device such as a manual sanding block (such as shown in FIG. 7) or powered sander. Common powered sanders that can generate a great deal of dust include oscillating and orbital sanders. As mentioned previously, the connection between the dust source and the second inlet 120 of the device 100 need not be direct and it can be preferred for the two parts to be spatially separated yet interconnected by a flexible length of ducting material.

The precise location of dust collection occurs is not critical. In some cases, the port or ports through which dust is collected are disposed on the abrasive surface itself, thereby preventing dust from being ejected from the surfaces being abraded. Alternatively, the port or ports could be located adjacent to the abrasive/workpiece interface along the same general plane of abrasion.

The second inlet axis 128 is aligned along a direction different from that of the first inlet axis 126 and the longitudinal axis 114. Optionally and as shown, the second inlet axis 128 is perpendicular to that of the first inlet axis 126 whereby air entering the primary region 110 flows along a transverse direction relative to the second inlet 120. Alternatively, the second inlet axis 128 could be arranged at some other angle relative to the first inlet axis 126 so long as the relative positioning of the first and second inlets 118, 120 do not channel air flow from the first inlet 118 into the second inlet 120.

The relatively fast moving air emanating from the first inlet 118 creates a local vacuum in the primary region 110 which acts to withdraw air from the second inlet 120. When the device 100 is in use, dust particles from the dust source are entrained in this air. The Venturi effect therefore provides continual suction, provided air flow is maintained, that captures and conveys dust into the primary region 110 of the body 102.

Finally, as shown in the figures, the device 100 includes the outlet 122, which is in fluid communication with the peripheral region 112. As FIG. 3 reveals, the outlet 122 extends along an outlet axis 130. Preferably, the outlet axis 130 aligned with at least the first inlet axis 126. More preferably and as shown, the outlet axis 130 is aligned with both the first inlet axis 126 and the longitudinal axis 114.

In some embodiments, the ratio of the cross-sectional area of the outlet 122 to that of the peripheral region 112, as defined perpendicular to the axis 130, is at least 1:1, at least 2:1, at least 3:1, at least 7:2, or at least 4:1. In some embodiments, of the cross-sectional area of the outlet 122 to that of the peripheral region 112 can be at most 18:1, at most 15:1, at most 13:1, at most 11:1, or at most 9:1.

The outlet 122 preferably has a configuration adapted for releasable connection to a receptacle for dust particles (not shown here) and such connection may be either direct or indirect. Where an indirect connection is used, the outlet 122 and receptacle may optionally be interconnected by a flexible corrugated hose.

In certain embodiments, and as shown in the figures, the outlet 122 has a generally cylindrical inner surface 132 that is threaded to accommodate a threaded male connector complemental with the inner surface 132.

Further included in the outlet 122 is a baffle 134 capable of diverting air flow through the outlet 122. In this particular embodiment, the baffle 134 has a generally helical configuration and is symmetrically disposed about the outlet axis 130. The helix of the baffle 134 may have any degree of rotation within the outlet 122. For example, in FIG. 3, the helix shows a one-half turn (spanning 180 degrees) and has a helix angle of approximately 39 degrees.

As a further option, two or baffles may be incorporated into the outlet 122, either in parallel or in series. The two or more baffles need not be identical to each other.

Technically, the baffle functions to create an air vortex within the outlet 122 that results in a change from laminar flow to transient flow. This flow then loses speed as a result of friction against the walls of the chamber 108 and outlet 122.

A dust sanding system 140 including the device 100 is shown in FIG. 7. To further attenuate the noise generated by the device 100, the dust sanding system 140 may further include a flexible hose 150 fitted with adaptors 152, 154 that connect the device 100 to a dust collection receptacle 160. As further shown, a length of flexible hose, or ducting 156, can also be used to operatively connect a sanding block 158 to the device 100. The nipple 151 allows the device 100 to be conveniently connected to a source of pressurized air.

The dimensions of the overall device 100 may be adjusted to facilitate handling and installation in automotive body shop or other commercial or industrial setting. The device 100 could have, for instance, an overall length-to-width aspect ratio of at least 1:1, at least 10:8, or at least 10:7. In the same or different embodiments, the device could have an overall length-to-width aspect ratio of at most 100:1, at most 10:1, or at most 10:3.

The body 102, first inlet 118, second inlet 120, and outlet 122 are preferably manufactured as an integral unit. When the device 100 is made as a single piece, the noise generated can be decreased because it lacks separate pieces that can vibrate relative to each other. Such vibrations generate pressure waves in the air that are perceived by the operator as noise.

There are no particular limits on fabrication methods and materials used to make the body 102, first inlet 118, second inlet 120, and outlet 122. In some embodiments, the aforementioned components of the device 100 are advantageously manufactured using three-dimensional printing or other additive manufacturing method. Alternatively, two or more parts of the device 100 could be made separately using a process such as injection molding and then the parts subsequently joined together. Polymer materials are preferred because they can be used to make a device 100 that is lightweight. Suitable engineering polymers that may be used to make the device 100 include acrylonitrile butadiene styrene, polyethylene, polypropylene, polyethylene terephthalate, along with copolymers and blends thereof.

In an exemplary method of using the device 100, a user connects the first inlet 118 to a compressed air line, connects the second inlet 120 to the abrading device, and then connects a flow-through dust collection bag to the outlet 122. Then, prior to operating the abrading device, the user directs air rapidly through the chamber 108 of the device 100, inducing the Venturi effect that causes dust to be evacuated from the abrading device to the dust collection bag.

Other features can further assist in reducing noise while simultaneously minimizing impact to the usual operation technique of the user. For example, a friction-reducing coating could be applied to the inner surfaces of the hose connecting the outlet 122 and the receptacle. For example, a polyethylene wax coating can be advantageously used for this purpose.

Further exemplary embodiments of the aforementioned dust extraction devices and related methods are enumerated below. Notably, these embodiments are not exhaustive.

1. A dust extraction device comprising: a body having a chamber; a first inlet communicating with the chamber extending along a first inlet axis and adapted for releasable connection to a source of pressurized gas; a second inlet communicating with the chamber extending along a second inlet axis and adapted for releasable connection to a dust source; and an outlet extending along an outlet axis and communicating with the chamber, the outlet adapted for releasable connection to a receptacle, wherein the outlet comprises at least one baffle that diverts flow of the gas within the outlet.

2. The dust extraction device of embodiment 1, wherein the at least one baffle has a helical profile.

3. The dust extraction device of embodiment 1 or 2, wherein the outlet has a cylindrical inner surface that is threaded.

4. The dust extraction device of any one of embodiments 1-3, wherein the first inlet axis and the outlet axis are mutually aligned.

5. The dust extraction device of embodiment 4, wherein the second inlet axis is oriented perpendicular to the first inlet axis.

6. The dust extraction device of any one of embodiments 1-5, further comprising a flexible hose having upstream and downstream ends, the upstream end being releasably coupled to the outlet and the downstream end being coupled to the receptacle.

7. The dust extraction device of embodiment 6, wherein the flexible hose has a friction-reducing coating disposed on its inner surface.

8. The dust extraction device of any one of embodiments 1-7, wherein the device has an overall aspect ratio ranging from 10:1 to 10:8.

9. The dust extraction device of embodiment 8, wherein the device has an overall aspect ratio ranging from 10:3 to 10:7.

10. The dust extraction device of any one of embodiments 1-9, wherein the first inlet comprises one or more tapered sections.

11. The dust extraction device of embodiment 10, wherein the one or more tapered sections have an enlarged cross-sectional area defined perpendicular to the first inlet axis at its upstream end and a respective reduced cross-sectional area at its downstream end, the ratio of the enlarged cross-sectional area to the reduced cross-sectional area ranging from 2:1 to 40:1.

12. The dust extraction device of embodiment 11, wherein the ratio of the enlarged cross-sectional area to the reduced cross-sectional area ranges from 8:1 to 30:1.

13. The dust extraction device of embodiment 12, wherein the ratio of the enlarged cross-sectional area to the reduced cross-sectional area ranges from 12:1 to 20:1.

14. The dust extraction device of any one of embodiments 1-13, wherein the chamber comprises a primary region and a peripheral region in communication with the primary region whose cross-sectional area defined perpendicular to the first inlet axis is smaller than that of the primary region, the first and second inlets communicating with the primary region and the outlet communicating with the peripheral region.

15. The dust extraction device of embodiment 14, wherein the ratio of the cross-sectional area of the primary region to that of the peripheral region ranges from 1:1 to 15:1.

16. The dust extraction device of embodiment 15, wherein the ratio of the cross-sectional area of the primary region to that of the peripheral region ranges from 3:1 to 10:1.

17. The dust extraction device of embodiment 16, wherein the ratio of the cross-sectional area of the primary region to that of the peripheral region ranges from 4:1 to 8:1.

18. The dust extraction device of any one of embodiments 14-17, wherein the outlet has an outlet cross-sectional area defined perpendicular to the first inlet axis and adjacent to the peripheral region, the outlet cross-sectional area being larger than that of the peripheral region.

19. The dust extraction device of embodiment 18, wherein the ratio of the outlet cross-sectional area to that of the peripheral region ranges from 1:1 to 18:1.

20. The dust extraction device of embodiment 19, wherein the ratio of the outlet cross-sectional area to that of the peripheral region ranges from 3:1 to 13:1.

21. The dust extraction device of embodiment 20, wherein the ratio of the outlet cross-sectional area to that of the peripheral region ranges from 4:1 to 9:1.

22. The dust extraction device of any one of embodiments 1-21, wherein the dust extraction device has a unitary construction.

23. The dust extraction device of embodiment 22, wherein the dust extraction device comprises a polymer selected from the group consisting of: acrylonitrile butadiene styrene, polyethylene, polypropylene, and polyethylene terephthalate.

24. A method of reducing airborne dust when operating an abrading device using the dust extraction device of any one of embodiments 1-23, comprising: connecting the first inlet to the source of pressurized gas; connecting the second inlet to the abrading device; connecting the receptacle to the outlet; and flowing the gas through the chamber to induce a Venturi effect whereby dust is evacuated from the abrading device to the receptacle.

25. The method of embodiment 24, wherein the receptacle comprises a gas-permeable filter.

26. The method of embodiment 24 or 25, wherein the second inlet and the abrading device are interconnected by a flexible hose whereby the dust extraction device is located remote from the abrading device.

EXAMPLES

Objects and advantages of this disclosure are further illustrated by the following non-limiting examples, but the particular materials and amounts thereof recited in these examples, as well as other conditions and details, should not be construed to unduly limit this disclosure.

Noise Evaluation Test Method

Noise was measured for a dust extraction device as described in Example 1. Each apparatus comprised an air entry port and an air outlet port. Two air lines preset at 50 pounds per square inch (psi), or 345 kilopascals (kPa), and 100 psi, or 690 kPa, and an 0.25 in (0.6 cm) omnidirectional microphone (obtained from Bruel & Kjaer of Santo Amaro, SP, Brazil) were provided. During testing, an air line was connected to the entry port of the dust extraction device and the microphone was disposed perpendicularly to but aligned with the air outlet port of said apparatus at a distance of about 15 cm. Sound pressure level, as measured in decibels (dB), was measured at frequencies ranging from about 0 hertz (Hz) to about 10 kilohertz (kHz). Results were analyzed using "LabShop Software" from Bruel & Kjaer, with sound versus frequency plots were generated using a Fast Fourier Transformation (FFT) analyzer.

In addition to using two air lines set at different pressures, the noise evaluation test was conducted using two configurations: with and without a dust collector bag (obtained from 3M Company, St. Paul, Minn.).

Example 1

A dust extraction device was prepared as follows. Acrylonitrile butadiene styrene (ABS) filaments were obtained from Movtech, Sao Bernardo do Campo, Brazil. Each filament weighed about 1 kg, had a diameter of about 1.75 mm and was about 400 m long. The ABS used to extrude the filaments had a density of 1.04 grams/cm$^3$ and melting point of 230° C. The filaments were fed into a fused deposition modeling machine (3D printer) assembled using: (i) pulleys, belts, step motors, bearings, hot end (0.4 mm nozzle and 40 W heater), power supply (500 W), heated bed (180 W at 12 V), tractor pulley and general bolts and fixtures obtained from Sethi3D of Campinas, SP, Brazil; (ii) a RepRap Graber 13 frame obtained from Alutech, Sao Paulo, SP, Brazil; and (iii) smooth rods obtained from Marvitubos of Ribeirao Preto, SP, Brazil.

Test Results

Figure 8:
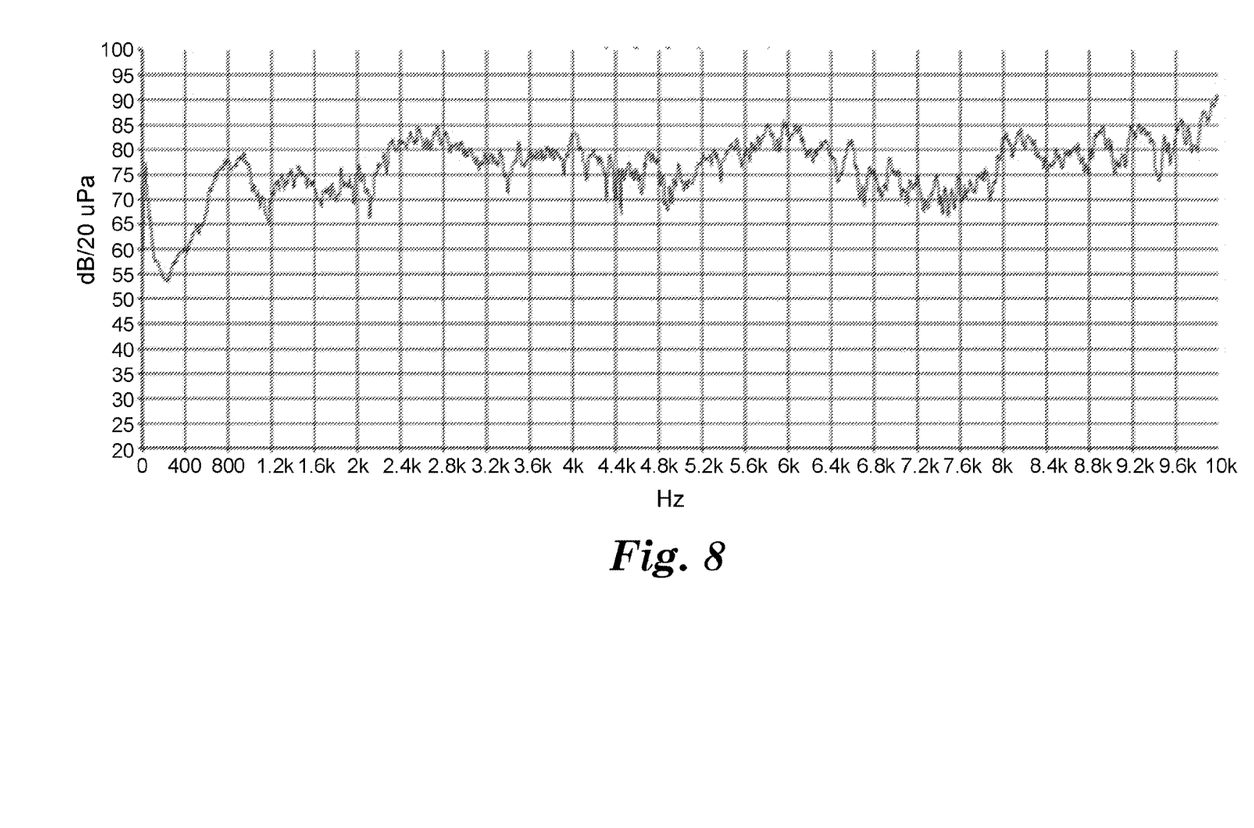
FIGS. 8-11 are exemplary plots of sound pressure level versus acoustic frequency obtained in evaluating an exemplary dust extraction device under various conditions.
Figure 9:
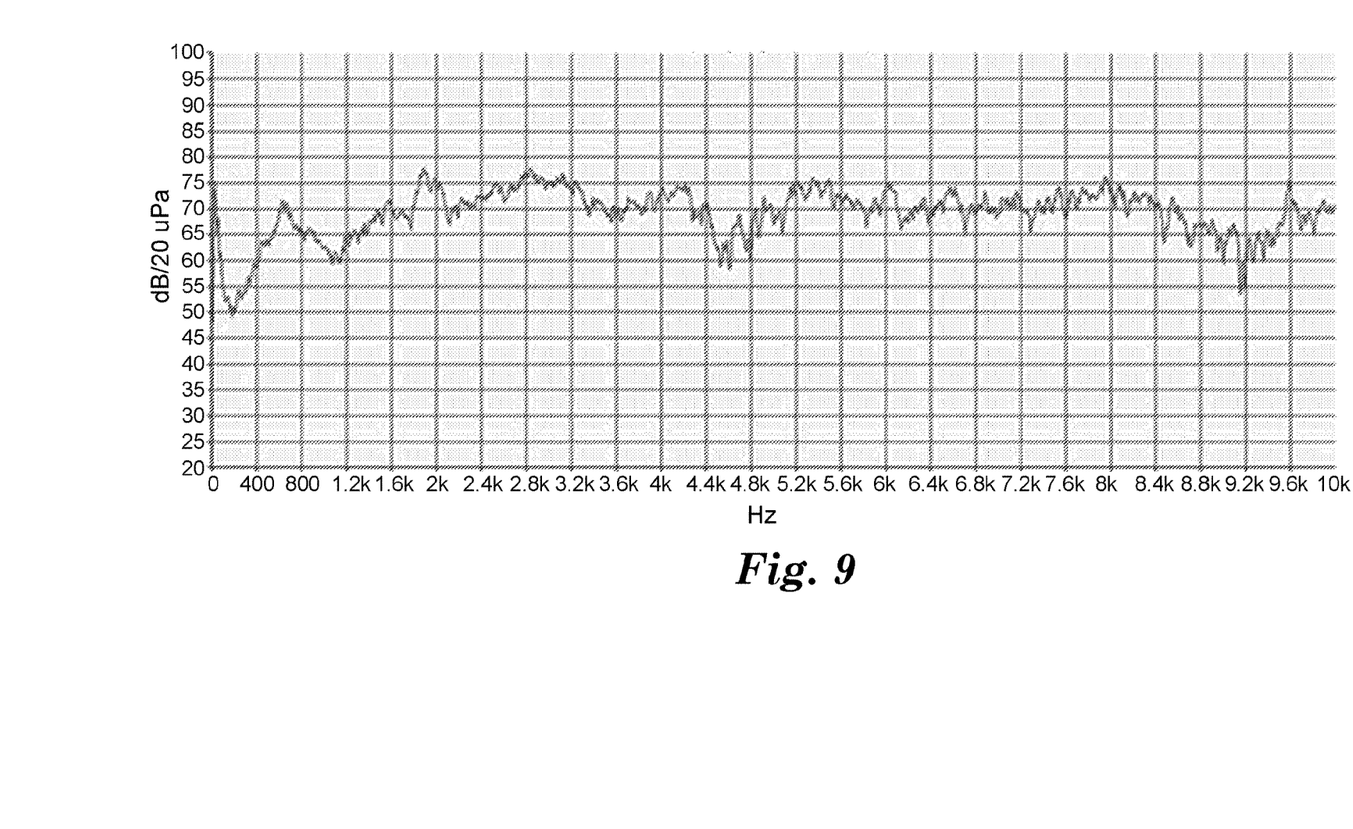
Figure 10:
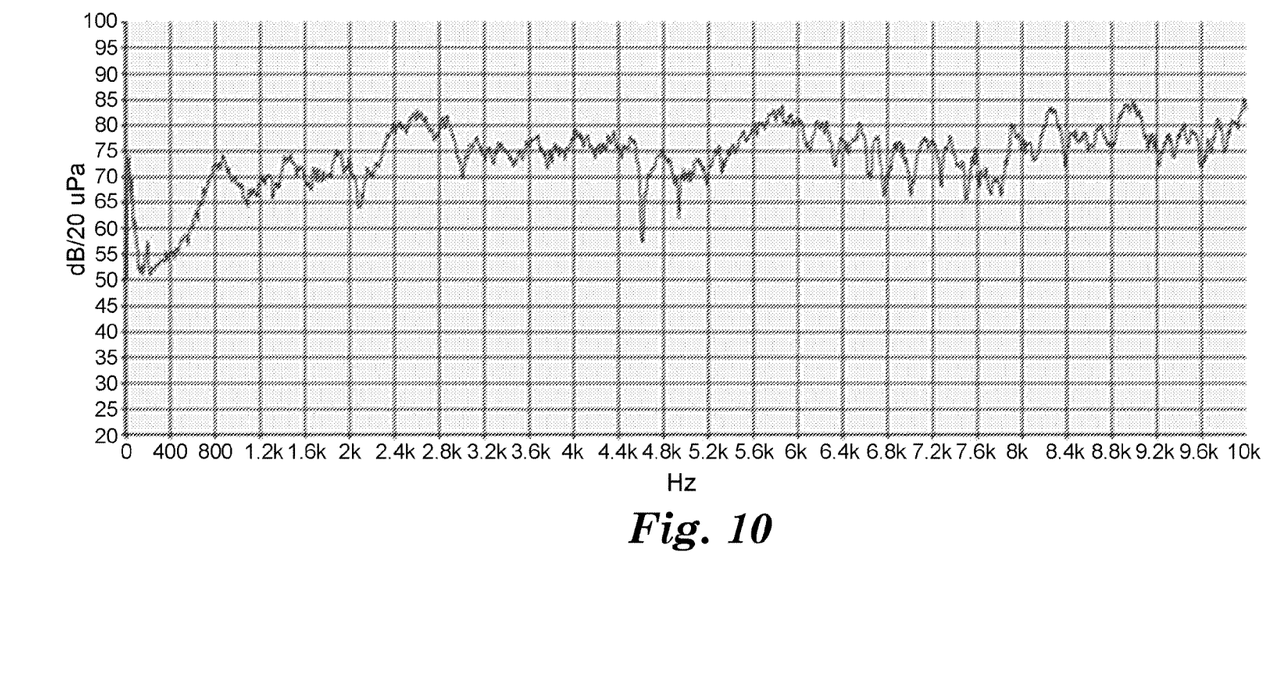
Figure 11:
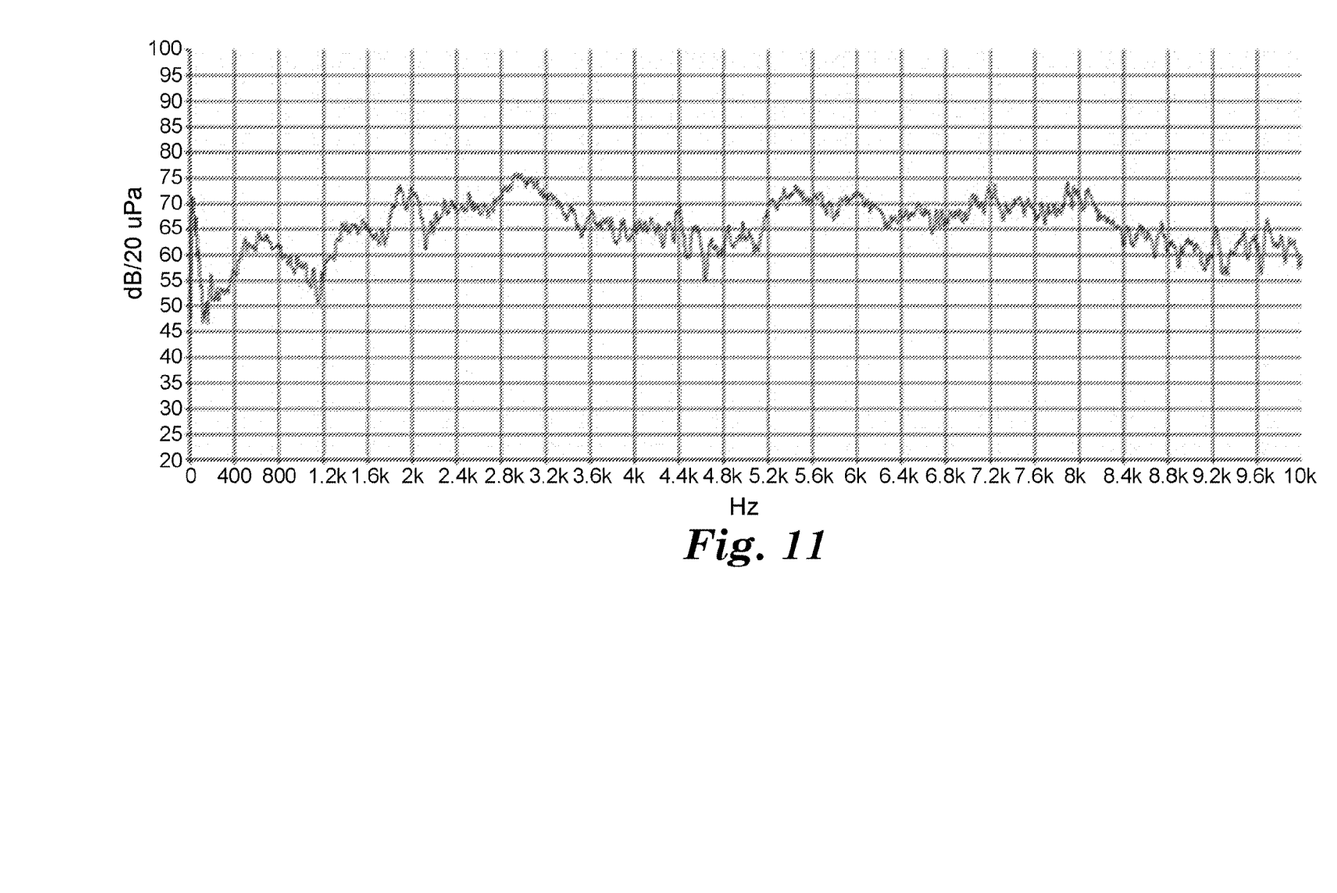

Results are shown as plots of sound pressure level (in dB) versus frequency (in Hz) in FIGS. 8-11, wherein FIG. 8 shows the results for Example 1 at a pressure of 100 psi without a dust collector bag coupled to the dust extraction device. FIG. 9 shows results for Example 1 at a pressure of 100 psi with the dust collector bag. FIG. 10 shows results for Example 1 at a pressure of 50 psi without the dust collector bag. FIG. 11 shows results for Example 1 at a pressure of 50 psi with the dust collector bag.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A dust extraction device comprising:
    a body having a chamber;
    a first inlet communicating with the chamber extending along a first inlet axis and adapted for releasable connection to a source of pressurized gas;
    a second inlet communicating with the chamber extending along a second inlet axis and adapted for releasable connection to a dust source; and
    an outlet extending along an outlet axis and communicating with the chamber, the outlet adapted for releasable connection to a receptacle, wherein the outlet comprises at least one baffle that diverts flow of the gas within the outlet to create an air vortex within the outlet that results in a change from laminar flow to transient flow.

2. The dust extraction device of claim 1, wherein the at least one baffle has a helical profile.

3. The dust extraction device of claim 1, wherein the outlet has a cylindrical inner surface that is threaded.

4. The dust extraction device of claim 1, wherein the first inlet axis and the outlet axis are mutually aligned.

5. The dust extraction device of claim 4, wherein the second inlet axis is oriented perpendicular to the first inlet axis.

6. The dust extraction device of claim 1 further comprising a flexible hose having upstream and downstream ends, the upstream end being releasably coupled to the outlet and the downstream end being coupled to the receptacle.

7. The dust extraction device of claim 6, wherein the flexible hose has a friction-reducing coating disposed on its inner surface.

8. The dust extraction device of claim 1, wherein the first inlet comprises one or more tapered sections.

9. The dust extraction device of claim 8, wherein the one or more tapered sections have an enlarged cross-sectional area defined perpendicular to the first inlet axis at its upstream end and a respective reduced cross-sectional area at its downstream end, the ratio of the enlarged cross-sectional area to the reduced cross-sectional area ranging from 6:5 to 10:1.

10. The dust extraction device of claim 1, wherein the chamber comprises a primary region and a peripheral region in communication with the primary region whose cross-sectional area defined perpendicular to the first inlet axis is smaller than that of the primary region, the first and second inlets communicating with the primary region and the outlet communicating with the peripheral region.

11. The dust extraction device of claim 10, wherein the ratio of the cross-sectional area of the primary region to that of the peripheral region ranges from 1:1 to 15:1.

12. The dust extraction device of claim 10, wherein the outlet has an outlet cross-sectional area defined perpendicular to the first inlet axis and adjacent to the peripheral region, the outlet cross-sectional area being larger than that of the peripheral region.

13. The dust extraction device of claim 12, wherein the ratio of the outlet cross-sectional area to that of the peripheral region ranges from 1:1 to 18:1.

14. The dust extraction device of claim 1, wherein the dust extraction device has a unitary construction.

15. A method of reducing airborne dust when operating an abrading device using a dust extraction device, the method comprising:
    providing the dust extraction device comprising:
        a body having a chamber;
        a first inlet communicating with the chamber extending along a first inlet axis and adapted for releasable connection to a source of pressurized gas;
        a second inlet communicating with the chamber extending along a second inlet axis and adapted for releasable connection to a dust source; and
        an outlet extending along an outlet axis and communicating with the chamber, the outlet adapted for releasable connection to a receptacle, wherein the outlet comprises at least one baffle that diverts flow of the gas within the outlet to create an air vortex within the outlet that results in a change from laminar flow to transient flow;
    connecting the first inlet to the source of pressurized gas;
    connecting the second inlet to the abrading device;
    connecting the receptacle to the outlet; and
    flowing the gas through the chamber to induce a Venturi effect whereby dust is evacuated from the abrading device to the receptacle.

* * * * *